3,009,918
PREPARATION OF BENZO(a)QUINOLIZINES
Harry Tacon Openshaw and Norman Whittaker, London, England, assignors to Burroughs Wellcome & Co. (U.S.A.) Inc., Tuckahoe, N.Y., a corporation of New York
No Drawing. Filed Jan. 19, 1959, Ser. No. 787,389
Claims priority, application Great Britain Jan. 22, 1958
10 Claims. (Cl. 260—289)

The present invention relates to the preparation of 11b-benzo(a)quinolizines. The numbering of this ring system is shown in the Formula I.

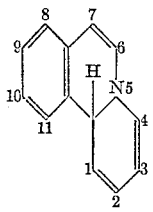

(I)

It has been found that the Mannich base (II) derived from a 1:2:3:4-tetrahydroisoquinoline is oxidized by a suitable oxidizing agent to give a 1:2:3:4:6:7-hexahydro-2-oxo-11b-benzo(a)quinolizine (III). This provides a new method for the preparation of compounds containing the benzo(a)quinolizine ring system.

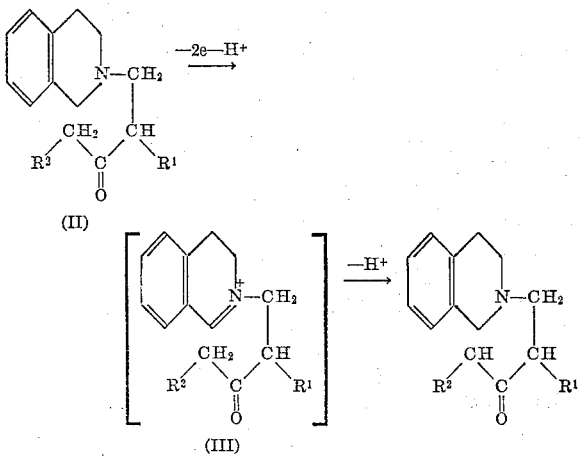

In these and subsequent formulae $R^1$ is an alkyl or aryl group, $R^2$ is a hydrogen atom or an alkyl group, and when $R^2$ is a hydrogen atom $R^1$ may also be a hydrogen atom. The isoquinoline ring system in the base (II) may carry one or more substituents in the benzene ring when the benzo(a)quinoline (III) produced will be correspondingly substituted.

The oxidation of the Mannich base (II) to the benzo-(a)quinolizine (III) is effected by any agent capable of oxidizing a 2-substituted 1:2:3:4-tetrahydroisoquinoline to the corresponding 3:4-dihydroisoquinolinium salt. Convenient examples of such agents are solutions of mercuric acetate, ferric chloride, chlorine, bromine or iodine.

The bases of Formula II are novel compounds and are prepared by a Mannich reaction of a 1:2:3:4-tetrahydroisoquinoline with formaldehyde and a ketone (IV) or ketoacid (V).

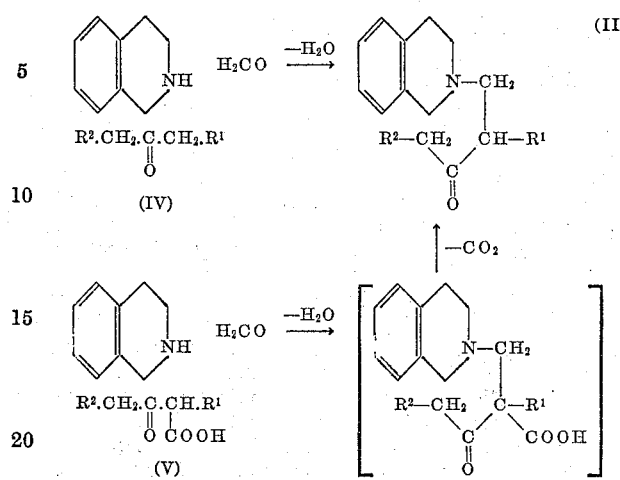

When in the ketone (IV) $R^1$ is an aryl group, or $R^1$ is a methyl group and $R^2$ is a hydrogen atom, the reaction gives the Mannich base (II) as shown.

When in the ketone (IV) $R^1$ is an alkyl group other than a methyl group and $R^2$ is hydrogen, the Mannich reaction occurs at either methylene group adjacent to the keto group, and the product contains in addition to the base (II) an isomeric compound in which the groups $R^1$ and $R^2$ are interchanged. The latter isomer does not form a benzo(a)quinolizine on oxidation, and does not fall within the present invention. The isomers may be separated, or the unseparated mixture may be oxidized and the benzo(a)quinolizine (III) isolated from the product.

When in the ketone (IV) $R^1$ and $R^2$ are both alkyl groups but are not the same, the Mannich reaction produces a mixture of two isomeric bases (II) both within the present invention. The bases may be separated, or the unseparated mixture may be oxidized and the two isomeric benzo(a)quinolizines (III) formed may be separated.

The isomeric Mannich bases or the isomeric benzo(a)-quinolizines are conveniently separated from each other by fractional crystallization of suitable salts such as the naphthalene-2-sulphonates.

When the keto acid (V) is used, only one Mannich base (II) is formed.

The present invention therefore comprises a method for the preparation of a benzo(a)quinolizine of the Formula III, which may carry one or more substituents in the benzene ring (for example alkoxyl groups or an alkylenedioxyl group at positions 9 and 10), by the oxidation of a correspondingly substituted Mannich base of the Formula II, using an oxidizing agent (for example mercuric acetate or iodine) capable of oxidizing a 2-substituted 1:2:3:4-tetrahydroisoquinoline to the corresponding 3:4-dihydroisoquinolinium salt.

The formulae drawn within square brackets represent possible but hypothetical intermediates, and the scope of the present invention is not limited by such an explanation of the mechanism underlying the reactions concerned.

The present invention will now be described with reference to the following examples.

*Example 1*

A stirred suspension of 1:2:3:4-tetrahydro-6:7-dimethoxyisoquinoline hydrochloride (100 g.) in methyl n-propyl ketone (555 ml.) and aqueous formaldehyde (38.8% w./v.) (37 ml.) was heated to reflux temperature during 10 minutes, and then heated under reflux for 40 minutes. The solution was cooled, and the resulting mass of crystals treated with sufficient water to dissolve the crystals. The supernatant layer of ketone was then removed by evaporation under reduced pressure, and the residual aqueous liquid diluted with water to 1500 ml.

Glacial acetic acid (200 ml.) and mercuric acetate (277.5 g.) were added, and the stirred mixture was maintained at 70–75° C. for 30 minutes. The suspension of mercurous salts was then cooled, saturated with hydrogen sulphide, and filtered through kieselguhr. The aqueous filtrate was concentrated to half its bulk in vacuo, made alkaline with an excess of potassium hydroxide and extracted with ether. The ethereal solution was washed with water, dried over anhydrous sodium sulphate, and evaporated. A solution of the residual gum in acetone was treated with a slight excess of a concentrated solution of naphthalene-2-sulphonic acid in acetone, and then set aside for several days. The mixture of naphthalene-2-sulphonates was collected and the acetone liquors were concentrated, yielding a further crop of mixture. The combined solid was heated under reflux with acetone (2200 ml.) for 30 minutes, and filtered. The solid was 3 - ethyl - 1:2:3:4:6:7 - hexahydro - 9:10 - dimethoxy - 2-oxo-11b-benzo(a)quinolizine naphthalene-2-sulphonate, melting point 198–199° C. with effervescence.

The acetone liquors were evaporated to dryness and the residue was crystallized from water, giving 2-(hex-3-onyl) - 1:2:3:4 - tetrahydro - 6:7 - dimethoxyisoquinoline naphthalene-2-sulphonate, melting point 140–143° C. Evaporation of the aqueous liquors to dryness in vacuo gave a mixture of the above two salts from which a further amount of the benzo(a)quinolizine naphthalene-2-sulphonate was isolated in the manner already described.

The free base, 3-ethyl-1:2:3:4:6:7-hexahydro-9:10-dimethoxy-2-oxo-11b-benzo(a)quinolizine, melting point 110–111° C., was obtained by treating a hot aqueous suspension of its naphthalene-2-sulphonate with aqueous potassium hydroxide, or with aqueous ammonia.

*Example 2*

Using the methods described in Example 1, 1:2:3:4-tetrahydro-6:7-dimethoxyisoquinoline hydrochloride (10 g.), diethyl ketone (55 ml.), and aqeuous formaldehyde (38.8% w./v.) (3.7 ml.) were reacted together, and the product was oxidized with mercuric acetate (27.75 g.) in the presence of acetic acid, yielding 1:2:3:4:6:7-hexahydro - 9:10 - dimethoxy - 1:3 - dimethyl - 2- oxo - 11b-benzo(a)quinolizine naphthalene-2-sulphonate, melting point 174–175° C. with effervescence. Recrystallization from ethanol gave the pure naphthalene-2-sulphonate, melting point 185–187° C. with effervescence. The free base, obtained by the method of Example 1, melted at 103–104° C.

*Example 3*

A stirred suspension of 1:2:3:4-tetrahydro-6:7-dimethoxyisoquinoline hydrochloride (5 g.) in benzyl methyl ketone (14.6 g.) and aqueous formaldehyde (38.8% w./v.) (1.77 ml.) was heated during 15 minutes to 100° C. and then maintained at 100° C. for 40 minutes. The solution was cooled, the resulting suspension of crystals shaken with water (150 ml.), and the excess ketone removed by extraction with ether. The aqueous liquid was concentrated to 75 ml. in vacuo, and then heated with mercuric acetate (13.87 g.) and glacial acetic acid (10 ml.) in the manner of Example 1. An ethereal solution of the crude product was concentrated to small bulk and set aside, giving 1:2:3:4:6:7-hexahydro-9:10-dimethoxy-2-oxo-3-phenyl-11b-benzo(a)quinolizine as the free base, melting point 169–170° C.

*Example 4*

An ice-cold solution of potassium hydroxide (3.36 g.) in water (45 ml.), and ethyl α-ethylacetoacetate (8.6 g.) were shaken together for 1 hour, and then set aside overnight at room temperature. The resulting solution was cooled to 0° C., brought to pH 5–6 with concentrated hydrochloric acid, and treated with 1:2:3:4-tetrahydro-6:7-dimethoxyisoquinoline hydrochloride (10 g.) and aqueous formaldehyde (38.8% w./v.) (3.37 ml.). The stirred solution was kept at 0° C. and, by periodic addition of concentrated hydrochloric acid, was brought from pH 6 to pH 3 during 2 hours. The solution was then set aside at room temperature overnight, and heated in vacuo to remove some methyl n-propyl ketone present. The residual aqueous solution was diluted to 150 ml. with water, heated with mercuric acetate (27.75 g.) and glacial acetic acid (20 ml.), and worked up in the manner of Example 1, yielding 3-ethyl-1:2:3:4:6:7-hexahydro-9:10-dimethoxy-2-oxo-11b-benzo(a)quinolizine naphthalene-2-sulphonate, melting point 198–199° C. with effervescence.

*Example 5*

Ethyl α-ethylacetoacetate (138 g.) was hydrolyzed with 0.93 N-potassium hydroxide (1034 ml.) and then reacted with 1:2:3:4-tetrahydro-6:7-dimethoxyisoquinoline hydrochloride (200 g.) and aqueous formaldehyde (38.8% w./v.) (67.4 ml.), in the manner of Example 4. The aqueous solution of Mannich base was diluted with water to 3000 ml., then heated with mercuric acetate (555 g.) and glacial acetic acid (400 ml.), and worked up in the manner of Example 1, yielding 3-ethyl-1:2:3:4:6:7-hexahydro - 9:10 - dimethoxy - 2 - oxo - 11b - benzo(a)quinolizine naphthalene-2-sulphonate, melting point 198–199° C. with effervescence.

*Example 6*

1:2:3:4:6:7 - hexahydro - 9:10 - dimethoxy - 2 - oxo-3 - n - propyl - 11b - benzo(a)quinolizine naphthalene-2-sulphonate, melting point 175–179° C. with effervescence, was prepared by the method of Example 4 from ethyl α-n-propylacetoacetate (15 g.) and 1:2:3:4-tetrahydro-6:7-dimethoxyisoquinoline hydrochloride (20 g.). Recrystallized from ethanol, the product melted at 186–187° C. with effervescence. The free base melted at 107–108° C.

*Example 7*

3 - n -butyl - 1:2:3:4:6:7 - hexahydro - 9:10 - dimethoxy - 2 - oxo - 11b - benzo(a)quinolizine naphthalene - 2-sulphonate, melting point 207–208° C. with effervescence, was prepared by the method of Example 4 [the by-product, methyl n-amyl ketone, being removed by ether-extraction] from ethyl α-n-butyl-acetoacetate (10.15 g.) and 1:2:3:4-tetrahydro-6:7-dimethoxyisoquinoline hydrochloride (10 g.). The free base melted at 111–112° C.

*Example 8*

Ethyl α-n-amylacetoacetate (21.8 g.) was shaken mechanically for 5 hours with 0.87 N-potassium hydroxide (138 ml.), and then reacted with 1:2:3:4-tetrahydro-6:7-dimethoxyisoquinoline hydrochloride (20 g.) and aqueous formaldehyde (38.8% w./v.) (6.74 ml.) and oxidized with mercuric acetate by the method of Example 7. The product, 3 - n - amyl - 1:2:3:4:6:7 - hexahydro - 9:10 - dimethoxy - 2 - oxo - 11b - benzo(a)quinolizine naphthalene-2-sulphonate, melted at 200–202° C. The free base had melted at 121–122° C.

*Example 9*

1:2:3:4-tetrahydro-6:7-dimethoxyisoquinoline hydrochloride (20 g.) was reacted with aqueous formaldehyde (38.8% w./v.) (7.4 ml.) and methyl-n-propyl ketone (111 ml.) in the manner of Example 1. To an aqueous solution (200 ml.) of the resulting Mannich base hydrochlorides was added a solution of naphthalene-2-sulphonic acid (18.5 g.) in water (50 ml.). The mixture was shaken for 3 hours, then set aside overnight.

The crystals which separated were collected, washed with water, pressed as dry as possible, and dissolved in hot acetone (75 ml.). Cooling the acetone solution to 0° C. gave crystals of 2-(hex-3-onyl)-1:2:3:4-tetrahydro-6:7-dimethoxyisoquinoline naphthalene-2-sulphonate of melting point 138–141° C. Recrystallization from acetone gave the pure salt, melting point 145–146° C. The free base melted at 37.5–38.5° C.

The above aqueous liquors were made alkaline with potassium hydroxide, extracted with chloroform, and the extract was washed with water, dried over anhydrous sodium sulphate, and evaporated. The residual gum was dissolved in acetone, neutralized with a solution of naphthalene-2-sulphonic acid in acetone, seeded, and set aside at 0° C. for several days. The resulting crystals of 2-(2-ethylbut-3-onyl)-1:2:3:4-tetrahydro - 6:7 - dimethoxyisoquinoline naphthalene-2-sulphonate, melted at 136–140° C. Recrystallization from acetone gave pure material, melting point 144–145° C. Admixture with the naphthalene-2-sulphonate of the isomeric 2-(hex-3-onyl)isoquinoline derivative depressed the melting point to 129–141° C.

Example 10

An aqueous solution of Mannich base, obtained from ethyl α-ethylacetoacetate (6.9 g.) and 1:2:3:4-tetrahydro-6:7-dimethoxyisoquinoline hydrochloride (10 g.) by the method of Example 5, was made alkaline with aqueous potassium hydroxide and extracted with chloroform. The extract was washed with water, dried over anhydrous sodium sulphate, and evaporated. The residual gum was dissolved in acetone, neutralized with a strong solution of naphthalene-2-sulphonic acid in acetone, and then seeded with 1:2:3:4 - tetrahydro-6:7-dimethoxyisoquinoline naphthalene-2-sulphonate. After standing at room temperature the crystals of this substance, melting point 188–191° C., were collected and discarded. The mother liquors were concentrated to 30 ml., scratched to induce crystallization and set aside at 0° C. for 2 days. Crystals of 2-(2-ethylbut-3-onyl) - 1:2:3:4-tetrahydro-6:7-dimethoxyisoquinoline naphthalene-2-sulphonate, melting point 140–142° C., separated. Recrystallized from acetone, this melted at 144–145° C. alone and in admixture with the second product of Example 9.

Example 11

2 - (2 - ethylbut - 3 - onyl) - 1:2:3:4 - tetrahydro-6:7-dimethoxyisoquinoline naphthalene-2-sulphonate (2 g.) was shaken with chloroform (25 ml.), water (50 ml.) and N-aqueous potassium hydroxide (5 ml.). The chloroform layer was separated, washed with water, and evaporated under reduced pressure. The residual gum was dissolved in water (50 ml.) containing glacial acetic acid (3 ml.) and then heated with mercuric acetate (2.56 g.) at 70–75° C. for 30 minutes. The reaction mixture was worked up in the manner of Example 1, yielding 3-ethyl-1:2:3:4:6:7 - hexahydro - 9:10 - dimethoxy - 2 - oxo - 11b-benzo(a)quinolizine naphthalene-2-sulphonate, melting point 197–198° C. with effervescence.

Example 12

1:2:3:4 - tetrahydro - 6:7 - dimethoxyisoquinoline hydrochloride (10 g.), ethyl methyl ketone (47 ml.) and aqueous formaldehyde (38.8% w./v.; 3.54 ml.) were heated together in a sealed tube at 100° C., with shaking until solution occurred, for 30 minutes. The reaction solution was cooled, treated with water (100 ml.), and the excess ketone was evaporated under reduced pressure. The residual aqueous solution was cooled to 0° C. and made alkaline with potassium hydroxide, yielding crystals of 1:2:3:4-tetrahydro - 6:7 - dimethyl-2-(2-methylbut-3-onyl)isoquinoline, melting point 97–98° C.

Example 13

Ethyl α-methylacetoacetate (12.55 g.) was hydrolyzed with 0.93 N-potassium hydroxide (103 ml.) and then reacted with 1:2:3:4-tetrahydro-6:7-dimethoxyisoquinoline hydrochloride (20 g.) and aqueous formaldehyde (38.8% w./v.) (6.74 ml.) in the manner of Example 4. The aqueous solution of Mannich base thus obtained was made alkaline with potassium hydroxide, yielding 1:2:3:4 - tetrahydro - 6:7 - dimethoxy - 2 - (2 - methylbut - 3 - onyl)isoquinoline, melting point 97–98° C.

Example 14

A mixture of 1:2:3:4-tetrahydro-6:7-dimethoxy-2-(2-methylbut-3-onyl)isoquinoline (1 g.), mercuric acetate (4.6 g.), water (30 ml.) and glacial acetic acid (5 ml.) was heated under reflux for 20 minutes. The cooled reaction mixture was treated with hydrogen sulphide, filtered through kieselguhr, and the filtrate was concentrated, made alkaline with potassium hydroxide, and extracted with chloroform. The chloroform extract was washed with water, dried over sodium sulphate, and evaporated. The residual gum was dissolved in acetone (10 ml.) and neutralized with a solution of naphthalene-2-sulphonic acid in acetone, giving 1:2:3:4:6:7-hexahydro-9:10 - dimethoxy - 3 - methyl - 2 - oxo - 11b - benzo(a)quinolizine naphthalene-2-sulphonate, melting point 200–202° C. with effervescence. The free base melted at 138–139° C.

Example 15

A solution of 1:2:3:4-tetrahydro-6:7-dimethoxy-2-(2-methylbut-3-onyl)isoquinoline (1 g.) and anhydrous potassium acetate (0.98 g.) in hot anhydrous ethanol (15 ml.) was treated with a solution of iodine (1.14 g.) in ethanol (15 ml.). The mixture was refluxed for 20 minutes, cooled, diluted with water, and the ethanol was removed under reduced pressure. The residual aqueous suspension of product was made alkaline with potassium hydroxide and extracted with chloroform. The chloroform extract was worked up by the method of Example 14, yielding 1:2:3:4:6:7-hexahydro - 9:10 - dimethoxy-3-methyl - 2 - oxo - 11b - benzo(a)quinolizine naphthalene-2-sulphonate, melting point 202–203° C. with effervescence.

Example 16

1:2:3:4-tetrahydro-6:7-dimethoxyisoquinoline hydrochloride (10 g.), acetone (38.3 ml.) and aqueous formaldehyde (38.8% w./v.) (3.54 ml.) were heated together in a sealed tube, with frequent shaking, at 100° C. for 25 minutes. After cooling, the mass of crystals was dissolved in water (150 ml.) and the excess acetone was evaporated under reduced pressure. The residual aqueous solution was cooled to 0° C., made alkaline with potassium hydroxide, and extracted with chloroform. The extract was washed with water, dried over sodium sulphate, and evaporated. The residual gum was dissolved in acetone (40 ml.) and neutralized with a strong solution of naphthalene-2-sulphonic acid in acetone, yielding a mass of crystals of 2-(but-3-onyl)-1:2:3:4-tetrahydro-6:7-dimethoxyisoquinoline naphthalene - 2 - sulphonate, melting point 167–168° C., with effervescence.

Example 17

A mixture of 2-(but-3-onyl)-1:2:3:4-tetrahydro-6:7-dimethoxyisoquinoline naphthalene-2-sulphonate (2 g.), mercuric acetate (5.42 g.), water (35 ml.) and glacial acetic acid (6 ml.) was heated under reflux for 20 minutes. The reaction mixture was worked up in the manner of Example 14, yielding the crude product in chloroform solution. The chloroform was evaporated and the residual gum dissolved in hot ether (4 ml.), cooled, and set aside at 0° C., giving crystals of 1:2:3:4:6:7-hexahydro - 9:10 - dimethoxy - 2 - oxo - 11b - benzo(a)quinolizine, melting point 146–150° C. Recrystallized from light petroleum (boiling range 60–80° C.), the product melted at 152–153° C.

Example 18

1:2:3:4-tetrahydroisoquinoline hydrochloride (20.9 g.), ethyl methyl ketone (132 ml.), and aqueous formaldehyde (38.8% w./v.) (10 ml.) were heated together in a sealed tube, with shaking until solution occurred, at 100° C. for 20 minutes. The cooled reaction solution was evaporated and the residual oil shaken vigorously with acetone (200 ml.). The resulting crystals of 1:2:3:4-tetrahydro-2-(2-methylbut-3-onyl)isoquinoline hydrochloride melted at 150–151° C. with effervescence.

Example 19

A mixture of 1:2:3:4-tetrahydro-2-(2-methylbut-3-onyl)isoquinoline hydrochloride (5 g.), mercuric acetate (25.2 g.), water (164 ml.) and glacial acetic acid (27 ml.) was heated under reflux for 10 minutes. The reaction mixture was worked up in the manner of Example 14, yielding a chloroform solution of crude product. The chloroform was evaporated and the residual gum was extracted with hot light petroleum (boiling range 60–80° C.) (200 ml.). The extract was evaporated, and the residual material was dissolved in benzene and poured down a column of activated alumina, eluting the column with benzene. The benzene solution of product was evaporated, and the residual solid dissolved in acetone and treated with ethereal hydrogen chloride, giving 1:2:3:4:6:7 - hexahydro - 3 - methyl-2-oxo-11b-benzo(a)-quinolizine hydrochloride, melting point 246–247° C. with effervescence. The free base melted at 95–96° C.

Example 20

1:2:3:4-tetrahydro-2-(2-methyl-but-3-onyl)-6:7 - methylene- dioxyisoquinoline hydrochloride, melting point 164–165° C. with effervescence, was prepared by the method of Example 18 from 1:2:3:4-tetrahydro-6:7-methylenedioxyisoquinoline hydrochloride (20. g.), methyl ethyl ketone (100.5 ml.) and aqueous formaldehyde (38.8% w./v.) (7.6 ml.).

Example 21

A mixture of 1:2:3:4-tetrahydro-2-(2-methyl-but-3-onyl) - 6:7 - methylenedioxyisoquinoline hydrochloride (4 g.), mercuric acetate (17.1 g.), water (112 ml.) and glacial acetic acid (19 ml.) was heated under reflux for 10 minutes. The cooled reaction mixture was worked up in the manner of Example 14 yielding a chloroform solution of crude product. The choloroform was evaporated and the residual gum was refluxed with ether (20 ml.) yielding crystals of 1:2:3:4:6:7 - hexahydro - 3 - methyl-9:10-methylenedioxy-2-oxo-11b - benzo(a)quinolizine, melting point 154–158° C. Recrystallization from ethanol gave the pure base, melting at 157–158° C.

Isoquinoline derivatives of the Formula II and benzo(a)quinolizine derivatives of the Formula III are valuable as chemical intermediates, for example for the synthesis of emetine and emetine analogues. Benzo(a)-quinolizine compounds of the Formula III have also been shown to possess sedative actions.

What we claim is:

1. A compound selected from the class consisting of the isoquinoline compounds of the formula

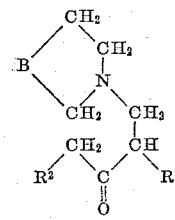

and the acid addition salts thereof, in which formula B is selected from the class consisting of the 1:2-phenylene the lower dialkoxy phenylene and the corresponding lower alkylenedioxy phenylene groups, $R^2$ is selected from the class consisting of the hydrogen atom and lower alkyl groups, and $R^1$ is selected from the class consisting of the hydrogen atom and lower alkyl and phenyl groups when $R^2$ is a hydrogen atom, and is selected from the class consisting of the lower alkyl and phenyl groups when $R^2$ is a lower alkyl group.

2. A compound selected from the class consisting of the isoquinoline compounds of the formula

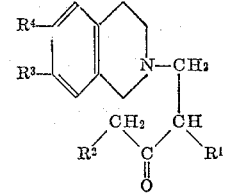

and the acid addition salts thereof, in which formula $R^4$ and $R^3$ are each selected from the class consisting of the hydrogen atom and alkoxyl groups having not more than four carbon atoms and taken together are an alkylenedioxy group having not more than four carbon atoms, $R^2$ has not more than four carbon atoms and is selected from the class consisting of the hydrogen atom and lower alkyl groups, and $R^1$ has not more than eight carbon atoms and is selected from the class consisting of the hydrogen atom and lower alkyl and phenyl groups when $R^2$ is a hydrogen atom, and is selected from the class consisting of the lower alkyl and phenyl groups when $R^2$ is a lower alkyl radical.

3. 2 - (2 - ethylbut - 3 - onyl) - 1:2:3:4 - tetrahydro - 6:7-dimethoxyisoquinoline.

4. A method for the preparation of isoquinoline compounds of the formula

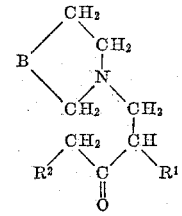

and the acid addition salts thereof, in which formula B is selected from the class consisting of the 1:2-phenylene the lower dialkoxy phenylene and the corresponding lower alkylenedioxy phenylene groups, $R^2$ is selected from the class consisting of the hydrogen atom and lower alkyl groups, and $R^1$ is selected from the class consisting of the hydrogen atom and lower alkyl and phenyl groups when $R^2$ is a hydrogen atom, and is selected from the class consisting of the lower alkyl and phenyl groups when $R^2$ is a lower alkyl group, comprising the reaction of a 1:2:3:4-tetrahydroisoquinoline with formaldehyde and a ketonic compound of the formula $$R^2.CH_2.CO.CHX.R^1$$

wherein X is selected from the class consisting of the hydrogen atom and carboxyl group and $R^1$ and $R^2$ have the meaning as defined above.

5. A method for the preparation of benzo(a)quinolizine compounds of the formula

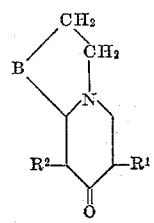

and the acid addition salts thereof, in which formula B is selected from the class consisting of the 1:2-phenylene the lower dialkoxy phenylene and the corresponding lower alkylenedioxy phenylene groups, $R^2$ is selected from the class consisting of the hydrogen atom and lower alkyl groups, and $R^1$ is selected from the class consisting of the hydrogen atom and lower alkyl and phenyl groups when $R^2$ is a hydrogen atom, and is selected from the class consisting of the lower alkyl and phenyl groups when $R^2$ is a lower alkyl group, comprising the oxidation of a correspondingly substituted isoquinoline derivative of the formula

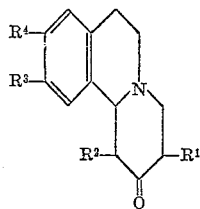

using an oxidizing agent capable of oxidizing a 2-substituted 1:2:3:4-tetrahydroisoquinoline to the corresponding 3:4-dihydroisoquinolinium salt.

6. A method for the preparation of benzo(a)quinolizine compounds of the formula

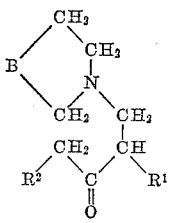

and the acid addition salts thereof, in which formula $R^4$ and $R^3$ are each selected from the class consisting of the hydrogen atom and alkoxyl groups having not more than four carbon atoms and taken together are an alkylenedioxy group having not more than four carbon atoms, $R^2$ has not more than four carbon atoms, and is selected from the class consisting of the hydrogen atom and alkyl groups, and $R^1$ has not more than eight carbon atoms and is selected from the class consisting of the hydrogen atom and alkyl and aryl groups when $R^2$ is a hydrogen atom, and is selected from the class consisting of the lower alkyl and phenyl groups when $R^2$ is a lower alkyl radical, comprising the oxidation of a correspondingly substituted isoquinoline derivative of the formula

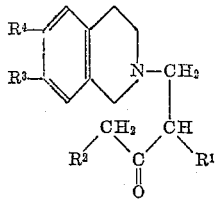

using an oxidizing agent capable of oxidizing a 2-substituted 1:2:3:4-tetrahydroisoquinoline to the corresponding 3:4-dihydroisoquinolinium salt.

7. A method for the preparation of 3-ethyl-1:2:3:4:6:7-hexahydro-9:10-dimethoxy-2-oxo-11b-benzo(a)quinolizine and acid addition salts thereof comprising the oxidation of a compound selected from the class consisting of 2-(2-ethylbut-3-onyl)-1:2:3:4-tetrahydro-6:7-dimethoxy-isoquinoline and the acid addition salts thereof using an oxidizing agent capable of oxidizing a 2-substituted 1:2:3:4-tetrahydroisoquinoline to the corresponding 3:4-dihydroisoquinolinium salt.

8. A method for the preparation of benzo(a)quinolizine compounds of the formula

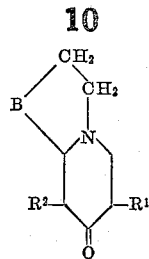

and the acid addition salts thereof, in which formula B is selected from the class consisting of the 1:2-phenylene the lower dialkoxy phenylene and the corresponding lower alkylenedioxy phenylene groups, $R^2$ is selected from the class consisting of the hydrogen atom and lower alkyl groups, and $R^1$ is selected from the class consisting of the hydrogen atom and lower alkyl and phenyl groups when $R^2$ is a hydrogen atom, and is selected from the class consisting of the lower alkyl and phenyl groups when $R^2$ is a lower alkyl group, comprising the oxidation of a correspondingly substituted isoquinoline derivative of the formula

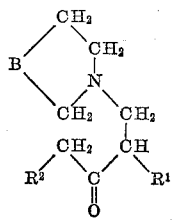

using mercuric acetate.

9. A method for the preparation of benzo(a)quinolizine compounds of the formula

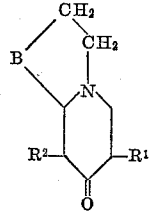

and the acid addition salts thereof, in which formula B is selected from the class consisting of the 1:2-phenylene the lower dialkoxy phenylene and the corresponding lower alkylenedioxy phenylene groups, $R^2$ is selected from the class consisting of the hydrogen atom and lower alkyl groups, and $R^1$ is selected from the class consisting of the hydrogen atom and lower alkyl and phenyl groups when $R^2$ is a hydrogen atom, and is selected from the class consisting of the lower alkyl and phenyl groups when $R^2$ is a lower alkyl group, comprising the oxidation of a correspondingly substituted isoquinoline derivative of the formula

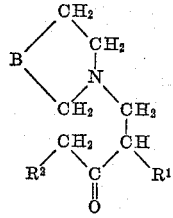

using iodine.

10. An acid addition salt of 2-(2-ethylbut-3-onyl)-1:2:3:4-tetrahydro-6:7-dimethoxyisoquinoline.

References Cited in the file of this patent
UNITED STATES PATENTS

| | | |
|---|---|---|
| 2,830,992 | Brossi | Apr. 15, 1958 |
| 2,830,993 | Brossi | Apr. 15, 1958 |

UNITED STATES PATENT OFFICE
CERTIFICATE OF CORRECTION

Patent No. 3,009,918                      November 21, 1961

Harry Tacon Openshaw et al.

It is hereby certified that error appears in the above numbered patent requiring correction and that the said Letters Patent should read as corrected below.

Column 1, lines 37 to 47, the right-hand formula should appear as shown below instead of as in the patent:

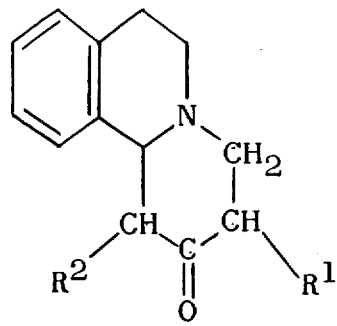

Signed and sealed this 8th day of May 1962.

(SEAL)
Attest:

ERNEST W. SWIDER
Attesting Officer

DAVID L. LADD
Commissioner of Patents